(No Model.) 4 Sheets—Sheet 1.

J. W. TERMAN.
CORN HARVESTER.

No. 432,650. Patented July 22, 1890.

Witnesses
J. Jessen.
C. L. Nachtneb

Inventor
James W. Terman
By Paul, Sanford & Merwin Att'ys.

(No Model.) 4 Sheets—Sheet 3.

J. W. TERMAN.
CORN HARVESTER.

No. 432,650. Patented July 22, 1890.

Witnesses.
J. Jessen.
C. L. Nachtrub.

Inventor.
James W. Terman.
By Paul, Sanford & Merwin attys.

(No Model.) 4 Sheets—Sheet 4.

J. W. TERMAN.
CORN HARVESTER.

No. 432,650. Patented July 22, 1890.

Witnesses.
J. Jessen
B. Booth

Inventor.
James W. Terman
By Paul, Sanford & Merwin attys

UNITED STATES PATENT OFFICE.

JAMES W. TERMAN, OF NEW SHARON, IOWA.

CORN-HARVESTER.

SPECIFICATION forming part of Letters Patent No. 432,650, dated July 22, 1890.

Application filed September 4, 1888. Serial No. 284,538. (No model.)

*To all whom it may concern:*

Be it known that I, JAMES W. TERMAN, of New Sharon, in the county of Mahaska, State of Iowa, have invented certain new and useful Improvements in Corn-Harvesters, of which the following is a specification.

My invention relates to improvements in a machine for harvesting or gathering the ears of corn from the stalk, removing the husk, and depositing the ears in a suitable receptacle.

My invention consists, generally, in the construction and arrangement hereinafter described, and particularly pointed out in the claims.

Figure 1:
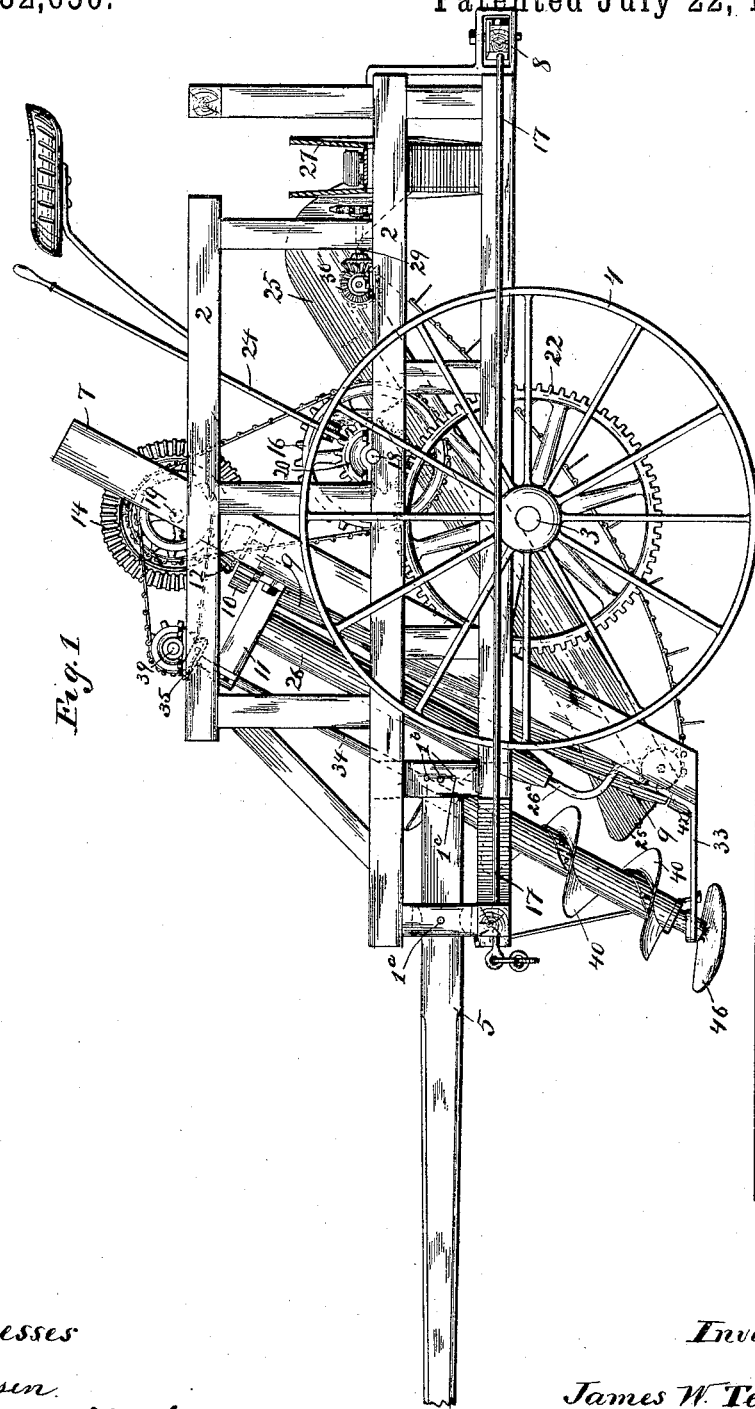
Figure 2:
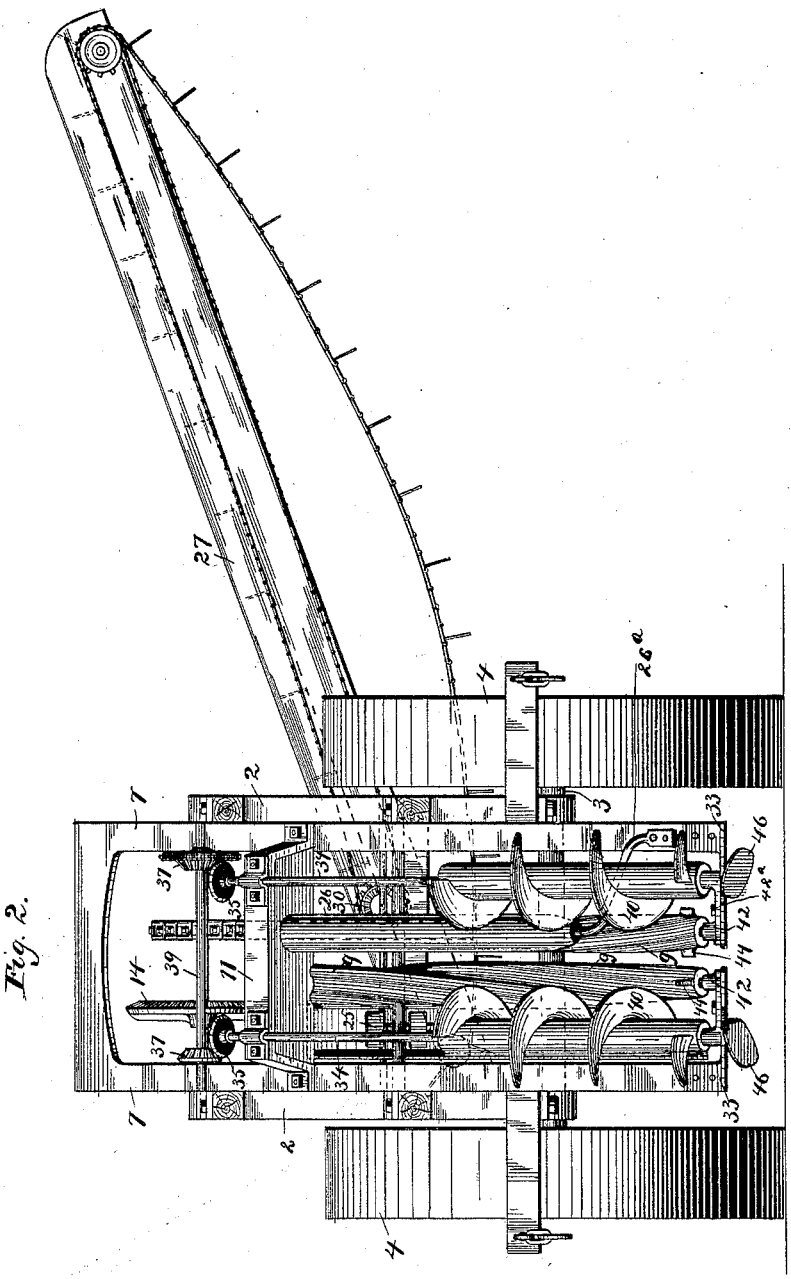
Figure 3:
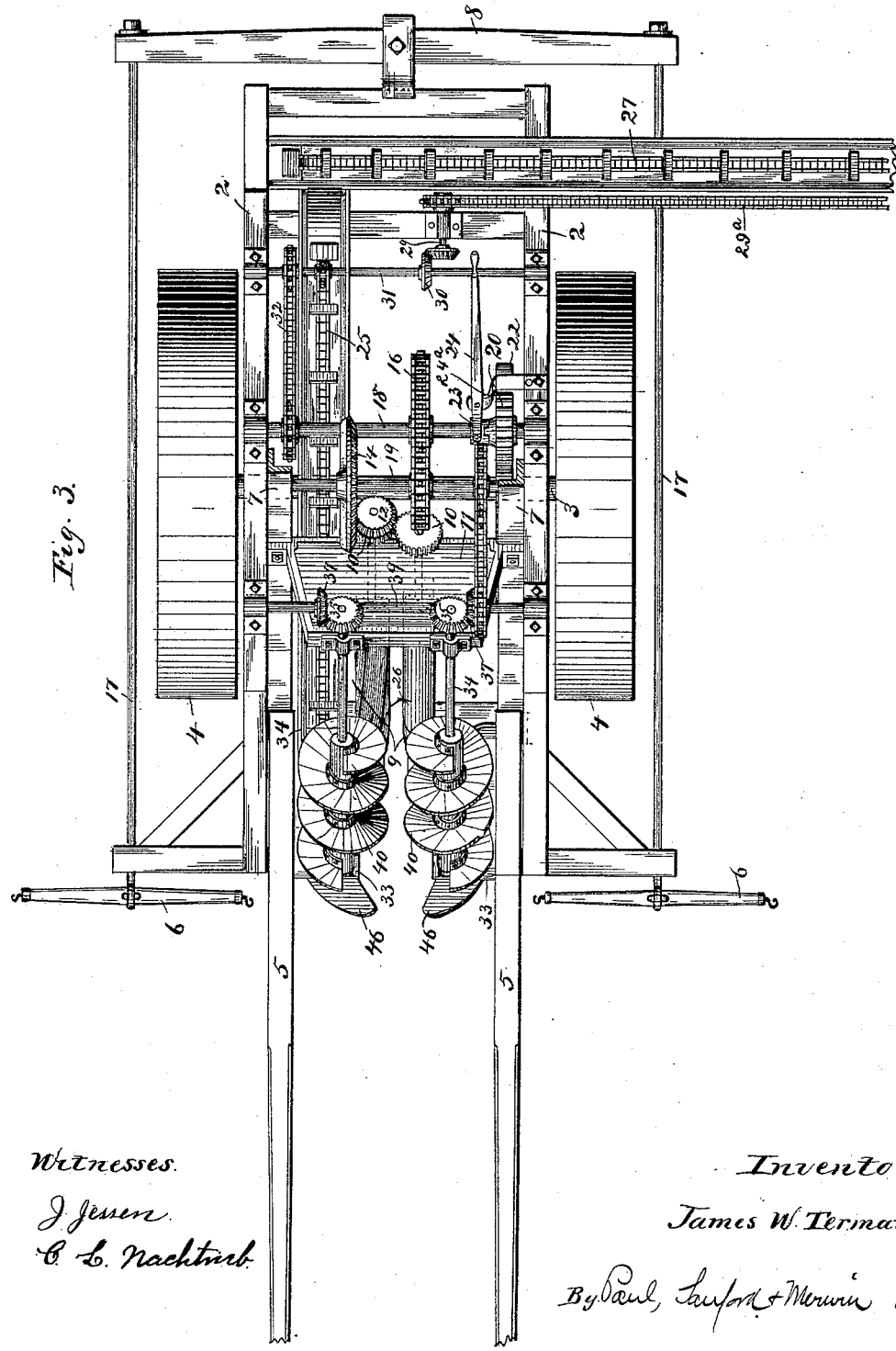
Figure 4:
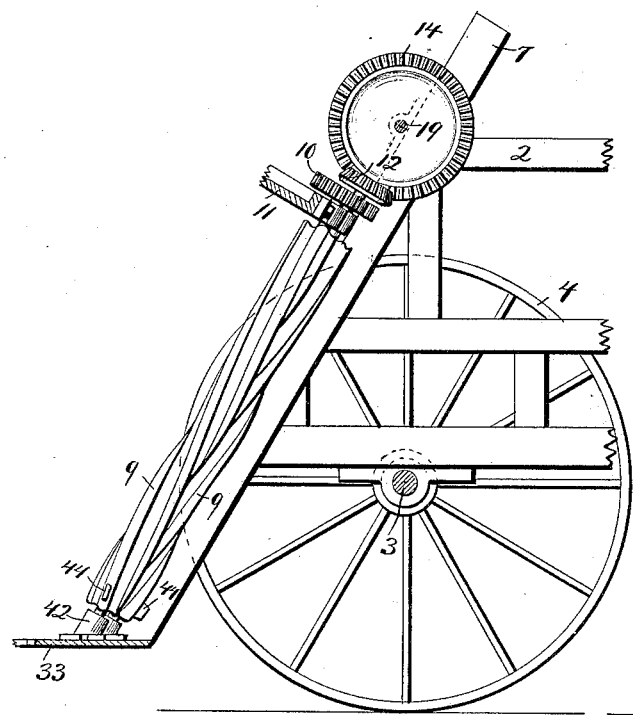
Figure 5:
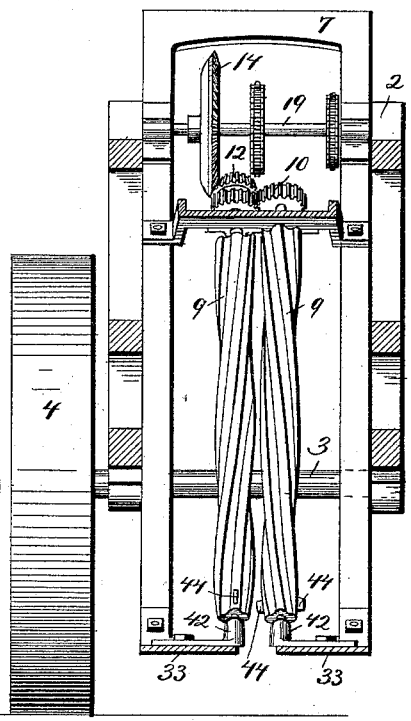
Figure 6:
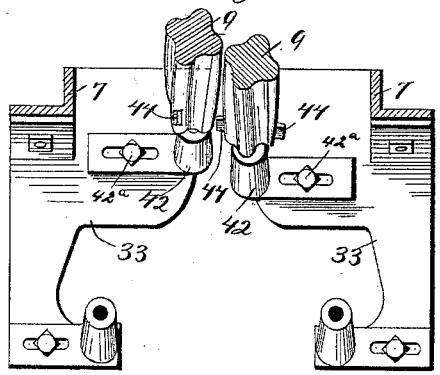

In the drawings which form a part of this specification, Figure 1 is a side elevation of a corn-harvesting machine embodying my improvement. Fig. 2 is a front elevation, and Fig. 3 is a plan view. Fig. 4 is a detail sectional view showing one spiral roll in advance of the other. Fig. 5 is a front view of same; Fig. 6, a cross-section through the spiral rolls and frame.

In the drawings, 2 represents the frame of the machine, constructed of any suitable form, to support the working mechanism. This frame is preferably mounted upon an axle 3, which is provided at each side of the frame 2 with traction-wheels 4, upon which the machine travels. I prefer to provide a tongue 5 at each side of the machine and extending forward in front of the same, and I prefer to attach the team upon the outside of these tongues in order to allow the horses to walk between the rows of corn. The tongues may be pivoted at 1ª to a part of the frame and may be held at various adjustments by a bolt passed through any one of a series of holes 1ᵇ, formed in an upright 1ᶜ and into the tongue itself.

The whiffletrees 6, to which the horses are attached, are preferably connected by means of a rod 17 to an evener-bar 8 at the rear of the machine in order to bring the draft centrally upon the machine and not interfere with the standing corn.

A bed-plate 7 is preferably supported upon the frame 2 and extends between the outer members of the frame at an angle, the incline advancing from top to the bottom of the machine. The two members or side bars of this bed-plate are separated at the bottom in order to allow the free passage of the corn between them. At the center of this bed-plate and running vertically parallel with it I prefer to place the husking-rolls 9. These husking-rolls are preferably driven in an opposite direction to each other by means of the gears 10, mounted upon the shaft of each of the said rolls and meshing with each other. The shafts or journals supporting the said husking-rolls are preferably mounted in suitable bearings upon the housing 11 at their upper end and upon the plate 33 at their lower extremity, the said housing and plate both being preferably secured to the bed-plate 7. The shaft of one of the rolls 9 is preferably provided with a beveled pinion 12, which is driven by a corresponding gear 14, meshing therewith and secured to a suitable cross-shaft 19, journaled in the upper portion of the bed-plate 7. Motion is imparted to this shaft preferably through a suitable sprocket and link belt from a sprocket 16 upon a shaft 18. The shaft 18 is preferably journaled in suitable bearings upon the frame 2, and is provided with a pinion 20, which meshes with the gear 22 upon the main shaft 3.

A suitable clutch 23 may be provided upon the shaft 18, which engages the pinion 20. This clutch is preferably controlled by an operating-lever 24, mounted upon a bracket 24ª, extending from the side of the frame 2, by which the engagement is made in order to stop the motion of the machine.

A conveyer 25 is preferably placed at the right hand of the machine and is supported upon the frame 2 and declines toward the forward part, preferably to a line with the lower extremity of the husking-rolls 9. The lower portion of the conveyer-box is preferably provided with a suitable apron or shield 25ª, extending outward and slightly in front of the husking-rolls, in order to receive the ears as they are broken from the stalk by the said husking-rolls. The husking-roll at the side farthest from the conveyer 25 is preferably set slightly in advance of the other, in order so that as the corn passes between the rolls and the ear is broken from the stalk the said ear will have a tendency to fall toward the side of the machine upon which the conveyer is located. To further insure this movement I prefer to place an idler-roll 26 in front of the advance roll 9. This roll is preferably supported at the bottom upon a suitable standard 26ª, secured to the bed-plate 7, and at the top is journaled in the housing 11, extending across the said bed-plate.

A conveyer 27 may be provided at the back end of the machine, extending outward to one side thereof, and so arranged as to receive the ears of corn from the conveyer 25 and convey them outward and deposit them outward and deposit them in a wagon or other suitable receptacle driven at the side of the machine. Motion is preferably imparted to this conveyer by the shaft 29, through suitable beveled gears 30, from the shaft 31, said shaft 29 being connected by a sprocket-chain 29ª with a shaft of the conveyer, which shaft is not shown. The shaft 31 also imparts motion to the conveyer 25, and this shaft is preferably driven by a link belt 32 engaging a suitable sprocket on the shaft 18.

Mounted in suitable bearings upon the housing 11 at the top and upon the plate 33 at the bottom I prefer to place the shafts 34. The upper extremity of these shafts is provided with the bevel-gears 35, which mesh with suitable pinions 37 on the shaft 39, journaled on the frame 2, and to which motion is imparted, preferably, by suitable sprockets and link belts from the shaft 19. The bevel-gears are so arranged upon the shafts 34 and 39 as to give the said shafts 34 a revolution in the opposite direction and toward the center as the machine is advanced.

A spiral conveyer 40 is preferably secured to each of the shafts 34 and preferably extends from the lower bearing of the shaft upward a sufficient distance to receive the ears of the standing corn and to lift and to properly guide the stalks to the husking-rolls as the machine is advanced. These spirals are preferably made right and left, and the advance is upward as they are revolved. These spirals and the shafts 34 are preferably made adjustable toward the center in order to vary the distance between them to suit the amount of corn contained in the row which is being acted upon. This adjustment may be effected in any way suggesting itself to the mechanic—for instance, by adjusting the boxes in which the shafts of the spirals are adjusted.

The husking-rolls 9 are made of the peculiar construction which I have found necessary in order to thoroughly accomplish the work of the machine. The exterior surface of these rolls is fluted spirally, preferably having four depressions and a corresponding number of ribs or projections between them. These flutes are formed in the roll with the spiral advanced from top to bottom a distance equal to a half of the circumference of the said roll. These rolls are made with right and left spirals, and with each revolution the projecting portions of the two surfaces will be brought opposite each other, and also the depressions in the surfaces are likewise brought opposite each other, thus causing the two rolls to act with the same effect as a set of opening and closing jaws, (and this effect is produced by the construction of the spiral throughout the entire length of the rolls at each revolution.) The hangers or steps 42, upon which the lower ends of the rolls are journaled, are preferably made adjustable upon the plate 33, in order that the distance between the rolls may be varied to suit the size of the stalks and ears of corn. This adjustment may be effected in any well-known way—for instance, by moving the step from one point to another and securing it at its new adjustment, or by swinging around the step after loosening the bolt 42ª, and then tightening up the bolt to hold the step to its adjustment.

Projections 44 may be placed at the lower end of the rolls to facilitate the passage of the material between them and prevent clogging.

It has been found difficult with machines of this class to raise the stalks of corn which have been lodged or blown down and cause them to pass through the machine to be operated upon. To avoid this difficulty I provide the lower end of the shaft 34 with a raising device consisting of a flight or blade 46. This is located upon the shaft below the bearing on the plate 33, and is placed at such an angle upon the said shaft and is of such construction that as it revolves one edge will be brought near the ground and will pass under any stalk which the ordinary conveyers would not strike and lift it and pass it to the conveyer 40.

The operation of the machine is as follows: The machine is introduced over a row of corn with the wheels 4 traveling in the furrows between the hills. The horses drawing the machine, traveling at the outside of the tongues 5, will also be brought between the rows of standing corn. The row to be acted upon will pass centrally through the machine as it is advanced. The spiral conveyers 40 in advance of the machine will receive the stalks and straighten and guide them in their passage through the machine. The lifters 46 at the lower end of the conveyer will, as before described, collect and raise such of the stalks as may be bent down and pass them upward to the conveyer 40. The space between the husking-rolls 9 is sufficient to allow the stalk to pass between them. This will bring the stem or portion connecting the ear with the stalk between the two husking-rolls. The stalk will be prevented from further passage by the enlargement of the ear. The stalk will remain in this position until the revolution of the husking-roll brings the two fluted portions opposite each other, when the ear will be advanced into the opening made by this operation. The two projecting portions of the spiral will then be brought opposite each other by a further revolution of the husking-roll, and the stem connecting the ear with the stalk will be nipped or broken inside of the shuck or husk. The ear of corn free from the husk will be forced out and fall into the conveyer-box 25, while the stalk and the husk will pass on through the machine. Any number of ears may be operated upon at the same time, as the spiral upon the two rolls causes the same operation to be performed over the entire length. The conveyer 25 receives the ears and passes them up and through the machine and delivers them to the side conveyer 27, by which they are carried outward and deposited free from the machine.

I do not claim, broadly, herein the spirally-fluted corn-husking rolls, as the same is claimed by me in an application filed December 31, 1888, Serial No. 295,015, as a division of this application.

I claim as my invention—

1. In a corn harvester and husker, the combination of the inclined fluted husking-rolls 9, one of them being in advance of the other, the idler-roll 26 in front of the advance roll of the husking-rolls 9, the shafts 34 on opposite sides of the husking-rolls 9 and in advance of the same and the idler-roll 26, and provided at their lower ends with the lifting-flights 46, and the spiral gathering-plates 40, secured to said shafts 34, substantially as and for the purposes set forth.

2. In a corn harvester and husker, the combination, with the spirally-fluted husking-rolls 9, of the shafts 34, arranged in front of said rolls and provided with the spiral gathering-plates 40 and with the lifting-flights 46, arranged upon the lower ends of said shafts, substantially as described.

In testimony whereof I have hereunto set my hand this 27th day of August, 1888.

JAMES W. TERMAN.

In presence of—
LAFAYETTE FRENCH,
E. J. AMES,
JAMES M. HUTCHINS.